United States Patent [19]
Van Der Valk

[11] Patent Number: 6,028,628
[45] Date of Patent: Feb. 22, 2000

[54] SIGNAL CORRECTION CIRCUIT

[75] Inventor: Nicolaas J. L. Van Der Valk, Breda, Netherlands

[73] Assignee: U.S. Philips Corporation, New York, N.Y.

[21] Appl. No.: 08/278,363

[22] Filed: Jul. 21, 1994

[30] Foreign Application Priority Data

Jul. 23, 1993 [BE] Belgium ................................. 9300770

[51] Int. Cl.$^7$ .................................................. H04N 9/64
[52] U.S. Cl. ........................................... 348/246; 348/616
[58] Field of Search ................................. 348/247, 246, 348/243, 617, 616, 615, 607, 619; 382/49

[56] References Cited

U.S. PATENT DOCUMENTS

| | | | |
|---|---|---|---|
| 3,904,818 | 9/1975 | Kovac | 348/243 |
| 4,481,539 | 11/1984 | Meise et al. | 348/247 |
| 4,485,399 | 11/1984 | Schulz et al. | 348/617 |
| 4,541,116 | 9/1985 | Lougheed | 382/49 |
| 4,701,784 | 10/1987 | Matsuoka et al. | 348/247 |
| 4,858,013 | 8/1989 | Matsuda | 348/247 |
| 4,975,864 | 12/1990 | Sendall et al. | 364/571.01 |
| 5,144,446 | 9/1992 | Suda et al. | 348/246 |

FOREIGN PATENT DOCUMENTS 0496573  7/1992  European Pat. Off. ....... H04N 5/217

OTHER PUBLICATIONS

"Digital Automatic Pixel Correction In New Generation CCD Broadcast Cameras", by B. Botte, IBC 1992, pp. 474–478.

*Primary Examiner*—Andrew I. Faile
*Assistant Examiner*—Andrew B. Christensen
*Attorney, Agent, or Firm*—Edward W. Goodman

[57] ABSTRACT

A signal correction circuit for correcting deviating pixel values includes a part (113, 117) for comparing a first pixel value ($R_{orig}$) of a given pixel with a second value ($R_{filt}$) obtained from pixel values of pixels surrounding the given pixel so as to supply a decision signal (decR) if a predetermined criterion is satisfied; and a multiplexer (115) coupled to the above-noted part (113, 117) for supplying the second value ($R_{filt}$) if the predetermined criterion is satisfied for not more than one color (R,G,B), and for supplying the first pixel value ($R_{orig}$) in the opposite case.

7 Claims, 2 Drawing Sheets

SIGNAL CORRECTION CIRCUIT

BACKGROUND OF THE INVENTION

1. Field of the Invention

The invention relates to a signal correction circuit for correcting deviating pixel values. Such a circuit is used, for example, for correcting CCD sensors, some pixels of which have a dark current which is larger than average. Particularly in sensors having many pixels, there is a great risk of drop out of one or more pixels having a deviating dark current.

2. Description of the Related Art

A signal correction circuit of this type is described in the article by B. Botte, "Digital automatic pixel correction in new generation CCD broadcast cameras", presented at the IBC 1992, pp. 474–478. In this circuit, a correction signal is corrected for the sensor temperature. To this end, the address of the faulty pixel should be known and, together with the magnitude of the correction, it should be stored in a memory. This circuit has the following drawbacks. The circuit is not flexible; if, in fact, new defects occur, the contents of the memory must be adapted. The temperature behavior is probably not so predictable so that the corrections are not complete. Moreover, the dark current of the pixels may vary with respect to time with a too large dark current or even become normal. Then, there will be erroneous corrections.

SUMMARY OF THE INVENTION

It is, inter alia an object of the invention to provide an improved signal correction circuit. To this end a first aspect of the invention provides a signal correction circuit for correcting deviating pixel color values, comprising means for receiving pixel color values for pixels for more than one color; filtering means for obtaining a plurality of second pixel color values from respectively corresponding pixel color values of pixels surrounding a given pixel having first pixel color values; and second means for supplying one of the second pixel color values if the respectively corresponding first pixel color value is larger than this second pixel color value, and for determining whether the first pixel color values exceed the respectively corresponding second pixel color values for not more than one color; wherein for correcting color signals of more than one color, the second means comprises means for supplying said one second pixel color value only if the respective first pixel color values exceed the second pixel color values for not more than one color. A second aspect of the invention provides a signal correction circuit for correcting deviating-pixel color values of more than one color, comprising means for receiving pixel color signals for more than one color; filtering means for detecting, per color, deviations of pixel color values to supply respective color deviation flag signals; color deviation flag signal combination means coupled to receive said color deviation flag signals for supplying, for each pixel color value, correction control signals which are each obtained in dependence upon all color deviation flag signals of the respective pixel color values detected for more than one color; and correction means coupled to said combination means for correcting the respective pixel color values per color. A third aspect of the invention provides a signal correction method for correcting deviating pixels of more than one color comprising the steps of receiving pixel color values for more than one color; detecting deviations of pixel values for each color separately; supplying correction control signals separately for each color on the basis of a combination of detected deviations of the pixel values detected for at least two colors; and correcting deviating pixels on the basis of said correction control signals for each color. A fourth aspect of the invention provides a signal correction circuit for correcting deviating pixel color values, comprising means for receiving pixel color values for more than one color; filtering means for obtaining a second pixel color value from pixel color values of pixels surrounding a given pixel having a first pixel color value; and second means for determining whether the first pixel color value exceeds the respectively corresponding second pixel color value for a given color, and for supplying the second pixel color value if the first pixel color value is larger than the second pixel color value; wherein for correcting pixel color values of more than one color, the filtering means includes means for providing said second pixel color value in dependence on at least one further pixel color value of said given pixel. A fifth aspect of the invention provides a television camera comprising a pick-up unit for providing pixel values of three colors; and a signal correction circuit for correcting deviating pixel values as defined above.

In accordance with the first aspect of the invention, a prediction is made for each pixel value, starting from adjacent pixels, for example pixel pairs which are situated symmetrically with respect to the relevant pixel (pixels at the top and the bottom, left and right, and also diagonally, with respect to the relevant pixel). The pixel value to be corrected can then be limited, for example, to the maximum of pairwise mean values of the adjacent pixel values. In this way, the invention is capable of removing a pixel deviation from a video signal without the signal being noticeably affected.

The distinction between correct picture information and a defective pixel is based on the recognition that light incident on only a single pixel is most unlikely. An embodiment of the circuit according to the invention determines a prediction from neighboring pairs by means of linear interpolation. The more neighboring pairs are used, the better the discrimination. In one embodiment, six pairs, i.e., twelve neighboring pixels are used. The measured pixel value is clipped at the maximum value of the six predictions. The advantage of this circuit is its adaptability to the situation. Each number and each value of single-pixel deviations can be corrected. The sole condition is that the pixels having a too large dark current must not be contiguous pixels, whereby preferably at least two correct pixels are present between two incorrect pixels, in the horizontal direction. It is possible to correct analog video signals in an analog manner. Alternatively, the correction may be performed on digital signals. Advantageously, the circuit according to the invention can be used in combination with the operation of generating horizontal and vertical contours because the same delayed signals are also necessary for this purpose.

A very attractive aspect of the invention is based on the recognition that the deviating pixels are very unlikely to coincide in the three color sensors of the same camera. When it is attempted by means of filters or other means to discriminate between information and defects for each individual color, there will be a great risk that information which seems to be a defect is also removed. Such misleading information which is to be maintained is constituted, for example, by the glitters giving the image the impression of sharpness. Such glitters are simultaneously present in the three chrominance channels and may thus be distinguished from faulty pixels which occur in a single chrominance channel only. An analog elaboration thereof is to add an extra signal to a non-additive mixer circuit in the green chrominance channel, this additional signal consisting of the sum of low-frequency green and high-frequency red. The sum of low-frequency green and high-frequency blue may be applied to a further input.

These and other aspects of the invention will be apparent from and elucidated with reference to the embodiments described hereinafter.

DESCRIPTION OF THE PREFERRED EMBODIMENT

Figure 1:
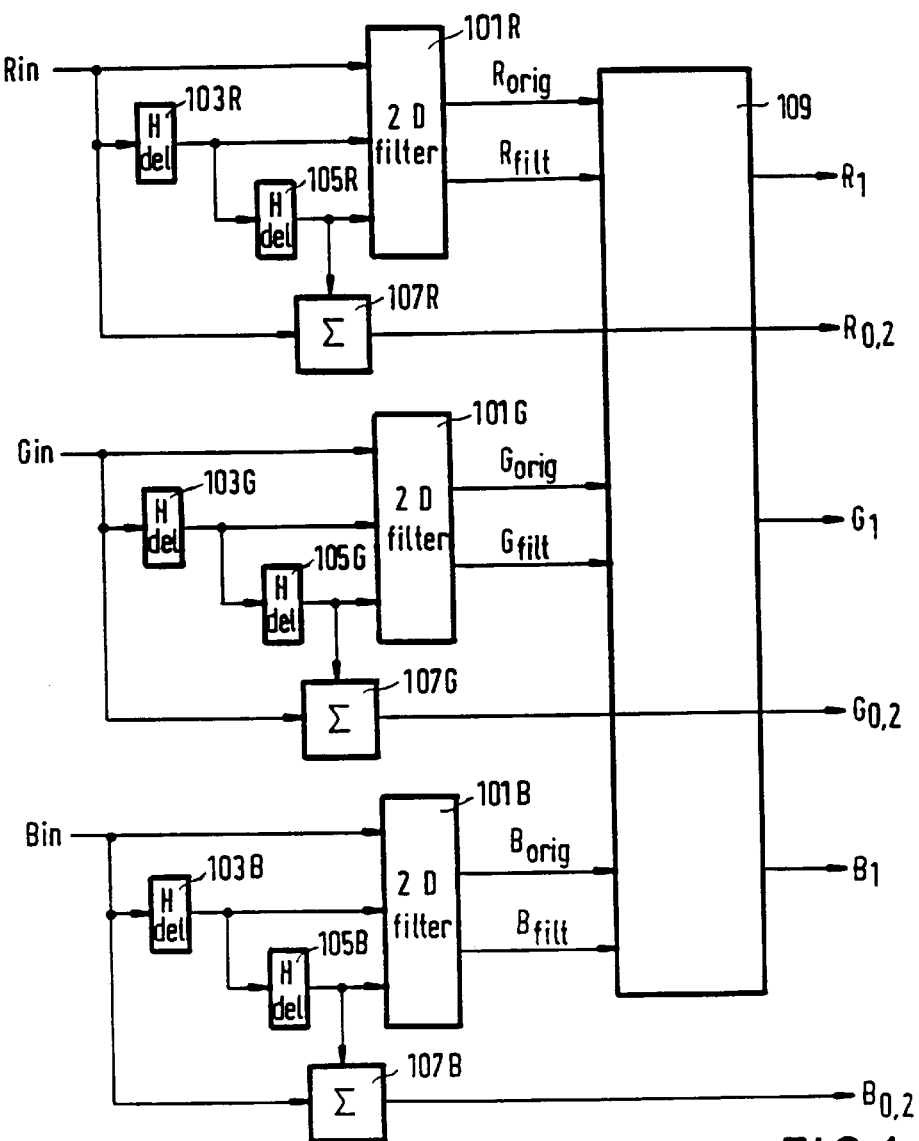
FIG. 1 shows a first embodiment of a signal correction circuit according to the invention.

The signal correction circuit of FIG. 1 uses two line delays 103, 105 denoted by H-del, per color R, G, B. Pixel values to be corrected are applied to the inputs Rin, Gin, Bin. The corrected pixel values can be taken from the outputs R1, G1 and B1. A pixel element having a deviating dark current can be recognized by comparing, per color, the pixel value of the relevant pixel with the pixel values of neighboring pixels. This recognition is performed by the 2-D filters 101 in FIG. 1. The pixel elements are corrected per color, but in accordance with the preferred embodiment of the invention shown in FIG. 1, information from the other chrominance channels is used to prevent small contours from being removed erroneously.

If a pixel value for a given color differs substantially from the pixel values of neighboring pixels, and if this difference is not present in the other color channels, the pixel will be considered to be deviating and its value will be replaced by a value derived from the pixel values of neighboring pixels. If, on the other hand, a deviation is detected in more than one chrominance channel at a time, it is assumed that this deviation represents a detail in the image and should thus not be removed. The decision to correct or not to correct is taken in the decision circuit 109, a part of which is shown in greater detail in FIG. 3. The correction circuit shown in FIG. 1 also performs some pre-processing operations for a contour correction module (not shown), which is also present in a camera, by making the sum (the average) $R_{0.2}$, $G_{0.2}$, $B_{0.2}$ of the input signal and the input signal delayed by two line periods available for each color.

Figure 2:
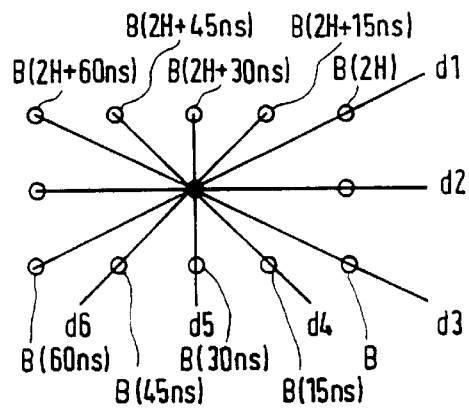
FIG. 2 shows a configuration of neighboring pixels to elucidate a 2-D filtering in the circuit of FIG. 1.

FIG. 2 shows a configuration of neighboring pixels to elucidate the operation of the 2-D filters 101 in the circuit of FIG. 1. For each chrominance channel, the values of neighboring pixels are averaged along the lines shown in FIG. 2 by adding, each time, the two pixels located on one line and by dividing them by two. This results in six mean values, the largest of which, $R_{filt}$, $G_{filt}$, $B_{filt}$, together with the input signals $R_{orig}$, $G_{orig}$, $B_{orig}$, are applied to the decision circuit 109.

Figure 3:
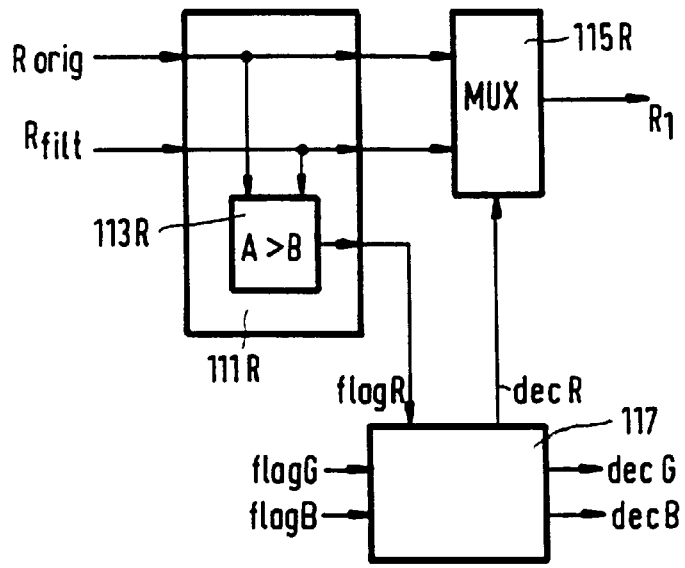
FIG. 3 shows an efficient form of a component of the circuit of FIG. 1.

As is shown in FIG. 3, a comparison circuit 113 in a part 111 of the decision circuit 109 checks for each color R, G, B, whether the original pixel value $R_{orig}$, $G_{orig}$, $B_{orig}$ is larger than the associated largest mean pixel value $R_{filt}$, $G_{filt}$, $B_{filt}$ computed by the 2-D filter 101. If this is the case, the comparison circuit 113 supplies a flag signal flagR (flagG, flagB) to a decision combination circuit 117 which, when only a single flag signal has been supplied, instructs the associated multiplexer 115 (by means of decision signal decR, decG and decB) to supply the filtered pixel values $R_{filt}$, $G_{filt}$ and $B_{filt}$ instead of the original pixel values $R_{orig}$, $G_{orig}$, $B_{orig}$, respectively. Of course, the original pixel value is supplied for the colors for which no flag signal has been supplied. If more than one flag signal has been supplied, the original pixel value will be supplied for all colors. For the sake of simplicity, FIG. 3 shows the part 111R, the comparison circuit 113R and the multiplexer 115R for the color Red only; of course, corresponding circuit elements are present for the other colors Green and Blue.

Figure 4:
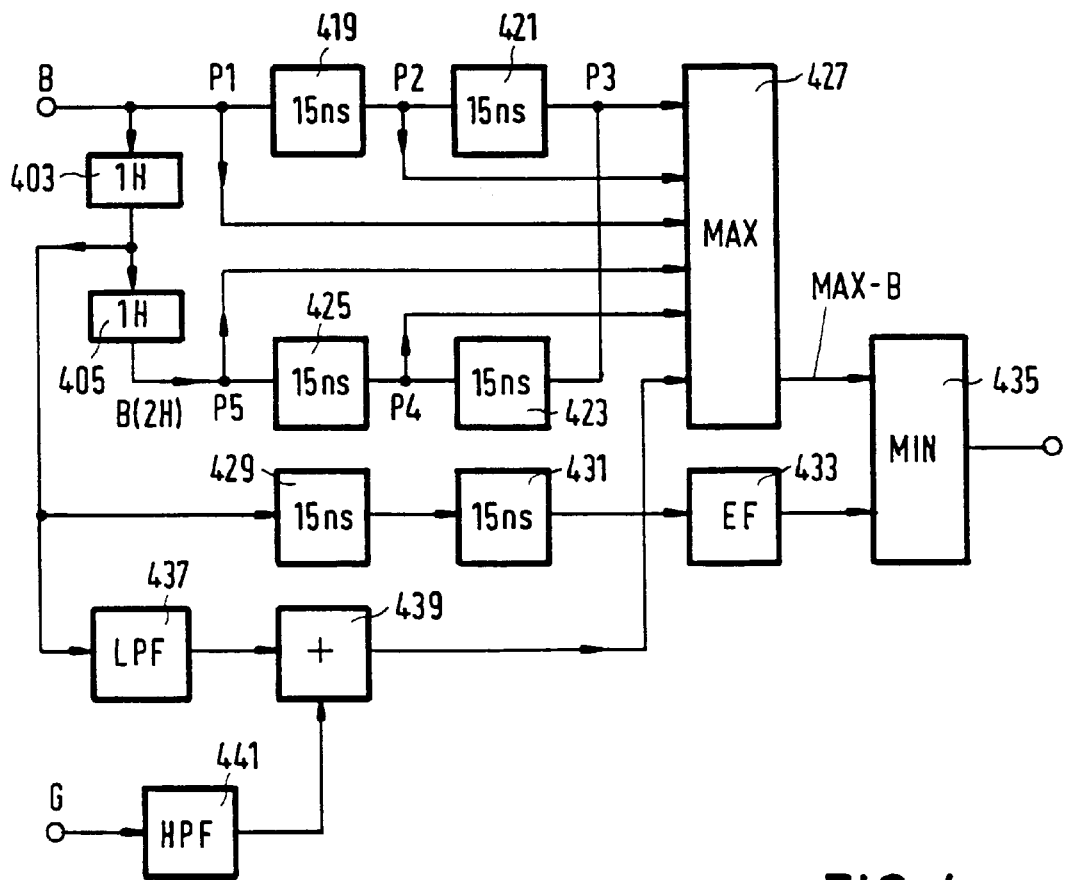
FIG. 4 shows a blue part of an analog signal correction circuit according to the invention.

FIG. 4 shows a blue part of an analog signal correction circuit according to the invention. The blue input signal B is applied to a series arrangement of two line delays 403 and 405. The blue input signal B is also applied to a series arrangement of four delay sections 419, 421, 423 and 425 which delay the blue input signal and the blue signal B(2H) delayed by two line periods each time by 15 ns. A period of 15 ns corresponds to the pixel space for HDTV signals; in normal definition television signals, (MAC, PAL, SECAM, NTSC) a delay of 70 ns would have to be used. These 15 ns delay sections 419–425 operate in such a way that a signal applied "at the rear" will appear in a delayed form "at the front", and that a signal applied "at the front" will appear in a delayed form "at the rear". Hence, the sum of the blue input signal B and the signal B(2H+60 ns) delayed by two line periods plus four times 15 ns is present at junction point P1. The sum of B(15 ns) and B(2H+45 ns) is present at junction point P2. The sum of B(30 ns) and B(2H+30 ns) is present at junction point P3. The sum of B(45 ns) and B(2H+15 ns) is present at junction point P4. The sum of B(60 ns) and B(2H) is present at junction point P5. The signals at the junction points P1–P5 are applied to a maximum circuit 427.

The signal B(1H) at the output of the line delay 403 is applied to an emitter-follower buffer EF via two 15 ns delay sections 429 and 431. A minimum circuit 435 determines the minimum of the output signal of the maximum circuit 427 and the output signal of the emitter-follower buffer EF. Similarly as in the digital embodiment described hereinbefore, the signal B(1H+30 ns) at the output of the delay section 431 is limited at a given position in the image to the maximum of signals derived from signals at a plurality of neighboring positions. Put in other words, the signal correction circuit of FIG. 4 comprises first means 419–427 for obtaining a second value MAX-B from pixel color values B, B(15 ns), B(30 ns), B(45 ns), B(60 ns); B(2H), B(2H+15 ns), B(2H+30 ns), B(2H+45 ns), B(2H+60 ns) of pixels surrounding a given pixel having a first pixel value B(1H+30ns), and second means 435 for supplying the second value MAX-B if the first pixel value B(1H+30 ns) is larger than the second value MAX-B. For correcting signals of different colors (R, G, B), the first means (419–427) include means (427) for providing the second vale (MAX-B), in dependence on at least one further pixel color value (G) of the given pixel.

To avoid misinterpretation of detail information in only one color as a 20 deviating pixel to be corrected, the embodiment of FIG. 4 also uses information of another color, viz. green (G). To this end, the pixel value B(1H) to be filtered is low-pass filtered in a low-pass filter 437 and subsequently added to a green signal G filtered by a high-pass filter 441; as a result it is achieved that the green detail information, which in fact is present in the high-frequency part of the green signal, is provided with the DC or luminance level associated with the blue signal. The sum signal of low-frequency blue and high-frequency green is subsequently applied to the maximum circuit 427. It is thereby achieved that the maximum MAX-B need not be adjusted at a lower value than a value associated with the green maximum if there is also a locally high pixel value in green, so that a locally high value in the blue signal is less rapidly cut off. If desired, the sum of low-frequency blue and high-frequency red may also be taken into account in determining the maximum. The circuit components (not shown) for the green and the blue signal are adapted to be such that in the green component, the sum of low-frequency green and high-frequency red and/or the sum of low-frequency green and high-frequency blue is taken into account in determining the maximum. In the red component, the sum of low-frequency red and high-frequency green and/or the sum of low-frequency red and high-frequency blue is taken into account in determining the maximum.

It is to be noted that the embodiments described hereinbefore are non-limitative and that those skilled in the art will be capable of designing many alternative embodiments without departing from the scope of the invention defined by the accompanying claims.

I claim:

1. A signal correction circuit for correcting deviating pixel values, comprising:
   means for receiving pixel color values for more than one color;
   filtering means for obtaining a plurality of second pixel color values from respectively corresponding pixel color values of pixels surrounding a given pixel having first pixel color values; and
   means for supplying one of the second pixel color values if a respectively corresponding one of the first pixel color values is larger than said one of the second pixel color values, and for determining whether the first pixel color values exceed the respectively corresponding second pixel color values for not more than one color;
   wherein for correcting color signals of of more than one color, the means for supplying comprises further means for supplying said one of the second pixel color values only if the respectively corresponding first pixel color values exceed the second pixel color values for not more than one color.

2. A signal correction circuit as claimed in claim 1, wherein the means for supplying comprises:
   comparison means for each color for comparing the first pixel color values of the given pixel with the respectively corresponding second pixel color values obtained from pixel color values of pixels surrounding the given pixel so as to supply a plurality of color flag respectively indicating if the first pixel color values exceed the second pixel color values;
   color flag signal combination means coupled to the comparison means for supplying a color signal correction decision signal if the first pixel color value, for the color corresponding to said one color signal correction decision signal, exceeds the respectively corresponding second color pixel value, while the first pixel color values of the other colors do not exceed the respectively corresponding second pixel color values; and
   switching means coupled to said comparison means and said color flag signal combination means for each color for supplying one of the second pixel color values if, for the color associated to said one second pixel color value, the color signal correction decision signal has been supplied, for the other colors, the first pixel color values being supplied, while all first pixel color values are supplied value in the opposite case in which no color signal correction decision signal has been supplied.

3. A signal correction circuit as claimed in claim 1, further comprising means for determining a plurality of mean pixel color values of pairs of pixels located diametrically with respect to the given pixel, and for determining corresponding maximum values of said mean pixel color values, wherein the second pixel color values are constituted said corresponding maximum values of said plurality of mean pixel color values of pairs of pixels located diametrically with respect to the given pixel.

4. A signal correction circuit for correcting deviating pixel color values of more than one color, comprising:
   means for receiving pixel color signals for more than one color;
   filtering means for detecting, per color, deviations of pixel color values to supply respective color deviation flag signals;
   color deviation flag signal combination means coupled to receiver said color deviation flag signals for supplying, for each pixel color value, correction control signals which are each obtained in dependence upon all color deviation flat signals of the respective pixel color values detected for more than one color; and
   correction means coupled to said color deviation flag signal combination means for correcting the respective pixel color values per color.

5. A method of correcting deviating pixel color values of more than one color, comprising the steps:
   receiving pixel color values for more than one color;
   detecting deviations of pixel values for each color separately;
   supplying correction control signals separately for each color on the basis of a combination of detected deviations of the pixel color values detected for at least two colors; and
   correcting deviating pixels on the basis of said correction control signals for each color.

6. A signal correction circuit for correcting deviating pixel color values, comprising:
   means for receiving pixel color values for more than one color:
   filtering means for obtaining a second pixel color value from pixel color values of pixels surrounding a given pixel having a first pixel color value; and
   means for determining whether the first pixel color value exceeds the respectively corresponding second pixel value for a given color, and for supplying the second pixel color value if the first pixel color value is larger than the second pixel color value; wherein for correcting pixel color values of more than one color, the filtering means includes means for providing said second pixel color value in dependence on at least one further pixel color value of said given pixel.

7. A television camera comprising:
   a pick-up unit for providing pixel values of three colors; and
   a signal correction circuit for correcting deviating pixel values, wherein the signal correction circuit is defined in accordance with claims 1, 4 or 6.

* * * * *